June 2, 1959  J. L. LINK  2,888,967
DEPTH GAUGING ATTACHMENT FOR HAND SAWS
Filed July 22, 1957
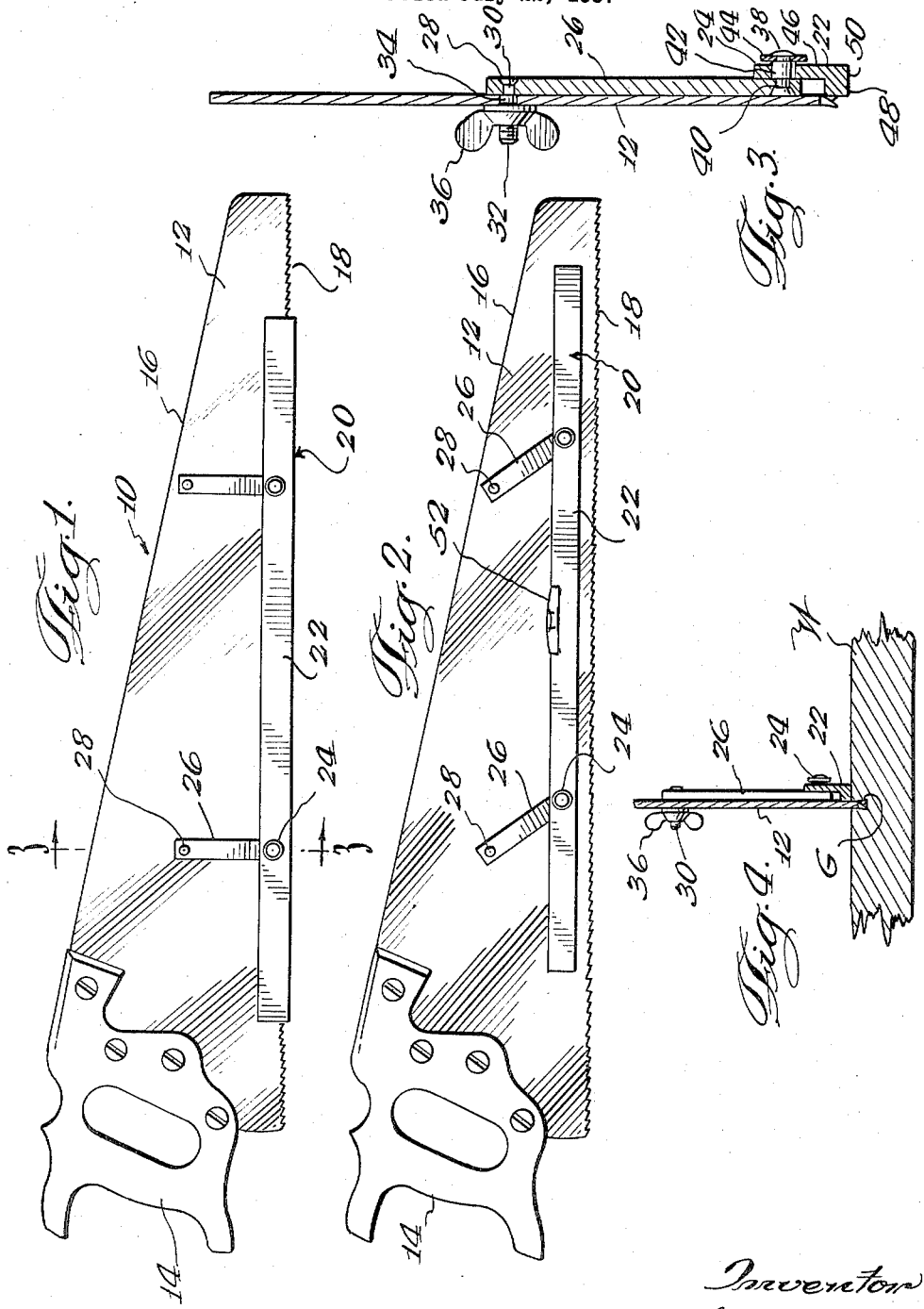
Inventor
Joseph L. Link
By Silverman & Mullen
Attorneys

2,888,967

DEPTH GAUGING ATTACHMENT FOR HAND SAWS

Joseph L. Link, Glenview, Ill.

Application July 22, 1957, Serial No. 673,275

2 Claims. (Cl. 145—35)

This invention relates to improvements in saws and particularly hand saws. Specifically the invention relates to an attachment for hand saws affording means for gauging the depth of cut made by the saw.

Heretofore, depth gauging attachments for saws have been introduced but none of these prior devices have proved successful because of various objectionable features and characteristics which they were not able to overcome. Especially objectionable was the rather complicated and cumbersome mechanisms provided for adjusting or varying the gauge in accordance with the desired depth of cut. Also objectionable was the fact that many of the prior devices were so constructed that the adjustability of the depth determining mechanism was limited to but a few predetermined positions rather than to an unlimited number of positions within rather wide limits.

It is therefore an important object of this invention to provide a depth gauging attachment for saws which will overcome all of the disadvantages mentioned hereinabove.

Another object is to afford a depth gauging attachment for saws which is readily adjustable without necessitating the use of any auxiliary means or devices.

A further object is to provide a device of the character described in which the depth determining means is adjustable universally to any predetermined position within the limits of the device itself.

Still another object is to afford a depth gauging attachment for saws so constructed and positioned that it also functions as a sheath for the teeth of the saw blade itself.

Still a further object is to provide an attachment of the character described in which the means for mounting and securing the attachment to the saw blade are so constructed that the same may be mounted on a saw of conventional construction without requiring any extensive alteration of the saw itself.

Yet another object is to afford a depth gauging attachment for saws which when attached to the saw does not materially interfere with the operation of the saw or the vision of the saw operator.

Yet a further object is to afford a saw gauge attachment having level gauging means incorporated therein.

A final object is to provide a depth gauging attachment for saws of simple, inexpensive yet sturdy construction.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a side elevational view of a hand saw equipped with a depth gauging device constructed in accordance with the principles of my invention;

Fig. 2 is a similar view showing the depth gauging attachment in operational position;

Fig. 3 is an enlarged sectional view taken on the plane of line 3—3 in Fig. 1 of the drawings and viewed in the direction indicated; and Fig. 4 is a similar but fragmentary sectional view showing the saw in operational position on a piece of work in which a groove is being sawed.

Referring now to the several figures of the drawings, reference numeral 10 indicates generally a saw of the conventional tapered form comprising a blade 12 with a handle 14 attached at one end. The blade 12 may be formed with an inclined or tapered top edge 16 and a horizontally positioned serrated or saw-toothed lower edge 18. The saw 12 is equipped with a depth gauging device indicated generally by reference numeral 20 which will now be described in detail.

The depth gauge 20 comprises essentially a horizontally positioned gauge bar 22 pivotally mounted by means of pivot devices such as 24 at the bottom of a pair of arms 26. The pivot arms 26 are in turn pivotally attached at their top ends to the saw blade 12 by means of pivot devices such as 28.

It will be noted that the arms 26 are of the same length and the upper pivots 28 are positioned in the same plane so that regardless of the position to which the arms 26 may be pivoted, the depth gauging bar 22 is always maintained in a horizontal plane.

The pivoting means 28 may comprise a pivot pin or rivet 30 one end of which is permanently affixed to the arm 26 and the other end 32 of which is rotatively positioned through an aperture 34 formed through the blade 12. The end 32 may be screw-threaded as shown in Fig. 3 of the drawings and a tightening device such as a wing nut 36 may be threaded thereon. Thus, the pivot device likewise comprises a clamping means enabling the arm 26 to be clamped and locked in any desired position.

The lower pivot device 24 may comprise a rivet 38 having its inner end 40 permanently riveted or affixed to the arm 26 and positioned rotatively through a sleeve 42 in turn positioned through an aperture in the gauging rod 22. A washer such as 44 may be mounted on the shank of the rivet adjacent the head 38 to facilitate the rotative function of the rivet.

Referring to Figs. 3 and 4 of the drawings it will be noted that the gauging rod 22 may be of substantially L-shaped cross-section with a vertically positioned elongated leg 46 and a horizontally positioned shorter leg 48 formed at the lower end thereof. The length of the horizontal leg 48 preferably is at least no longer than the thickness of the arm 26. This insures proper rotative movement without binding against the saw blade. It should also be noted in Figs. 1 and 3 of the drawings that the bottom of the rod 22 protrudes beyond the lower edges of the saw teeth when the gauge is positioned as shown in Fig. 1 of the drawings. Thus, the same comprises a shield protecting the saw teeth of the saw when the same is not being used as a gauge.

When it is desired to use the device as a gauge the arms 26 are pivoted to any desired angular position until the horizontal bar is positioned in spaced relationship above the teeth 18 so that the space between the bottom edge 50 of the bar and the bottom of the teeth 18 is such as to provide the depth of cut desired. The wing nuts 38 are then tightened thereby locking arms 26 in the preselected position and further locking in position the depth gauging rod 22. The saw may then be used in any conventional manner, as for example to cut a groove G in the work piece W as shown in Fig. 4 of the drawings. The depth of the groove G is, of course, determined by the spaced relationship of the depth gauging bar 22 with respect to the teeth 18. It will thus be readily noted that any desired depth of groove may be readily selected and formed.

If desired the horizontal depth gauging rod 22 may be provided with a level bubble device such as 52 as shown in Fig. 2 of the drawings. When so equipped the depth gauging device may function also as a carpenter's level. Since the depth gauging attachment may be readily removed from the saw by merely unscrewing the wing nuts 36 is should be apparent that little difficulty is encountered in converting the depth gauging attachment to a leveling device. Of course, if desired, the device may be used as a leveling device while still remaining attached to the saw.

From the above description and drawings it should be apparent that I have provided an extremely simply constructed but most effectve and sturdy depth gauging attachment for saws which may be readily mounted on a conventional hand saw by merely forming two spaced apertures therethrough suitable for accommodating therein the shank of pivot members such as 30. The device is readily adjustable to gauge any desired depth groove or cut by merely loosening the two wing nuts 36 and pivoting the supporting arms 26 to an angular position which will in turn position the horizontal depth gauging rod 22 in spaced relationship with the saw teeth 18 to the desired depth. The device is constructed of a minimum number of parts and is so compact that it offers little interference to the vision of the operator. It is further constructed so that it may be used as a sheath or guard for the saw teeth. Furthermore, the attachment may be provided with a graduated level bubble device thereby enabling the same to likewise function as a carpenter's level tool.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. In a depth gauging device for saws having a toothed saw blade, a gauging member, means for removably and pivotally mounting said gauging member on fixed pivot points adjacent said saw blade and in parallelism with the blade teeth, said means permitting raising and lowering said gauging member with respect to said toothed blade while simultaneously maintaining said member in parallel relationship with said blade teeth and means for locking said member in any pre-selected position, said first-mentioned means comprising a pair of arms positioned in parallel spaced relationship one with the other, a pivot pin connected one to the upper end of each of said arms, said saw blade formed with a pair of openings therethrough, said pivot pins rotatably positioned one through each of said openings, said gauging member pivotally connected to the lower ends of said arms, and said locking means comprising wing-nuts threaded on the free ends of said pivot pins and adapted to frictionally engage the side of the saw blade.

2. In combination with a saw having a handle and a saw blade with a toothed edge, a depth gauging device comprising a gauging bar, a pair of arms the top ends of which are positioned equidistant from said toothed edge, said arms positioned in parallel spaced relationship one with the other, rivets pivotally connecting said bar to the lower ends of said arms, pivot pins pivotally connecting the upper ends of said arms to the saw blade, said saw blade having openings through which the ends of said pivot pins protrude, said pin ends being screw-threaded, wing-nuts mounted one on each of said pin ends, said wing nuts capable of frictionally engaging the saw blade to lock said arms in any selected angular position, the length of said arms being such that in one position the gauging bar extends beyond the toothed edge to shield the teeth of said saw.

References Cited in the file of this patent

UNITED STATES PATENTS

| | | |
|---|---|---|
| 286,018 | Jones | Oct. 2, 1883 |
| 1,297,689 | Hinkle | Mar. 18, 1919 |
| 1,571,231 | Bolli | Feb. 2, 1926 |
| 2,439,346 | Nash | Apr. 6, 1948 |
| 2,769,470 | Akers | Nov. 6, 1956 |